Aug. 8, 1967  J. R. MAJKRZAK  3,334,577
PLUNGER SAFETY STOP FOR BALERS
Filed March 26, 1965
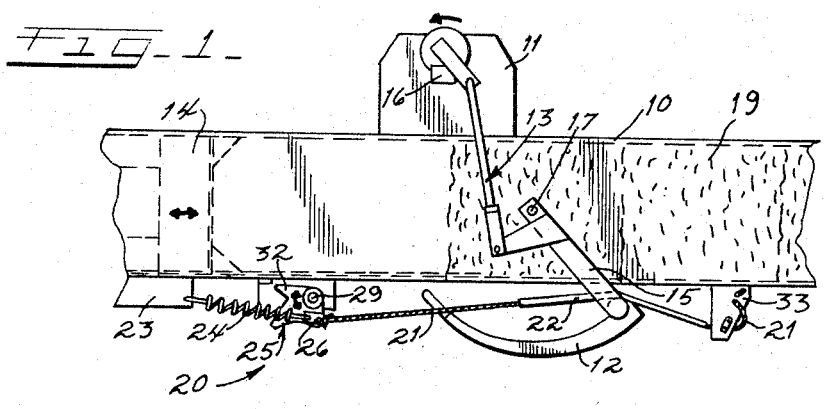
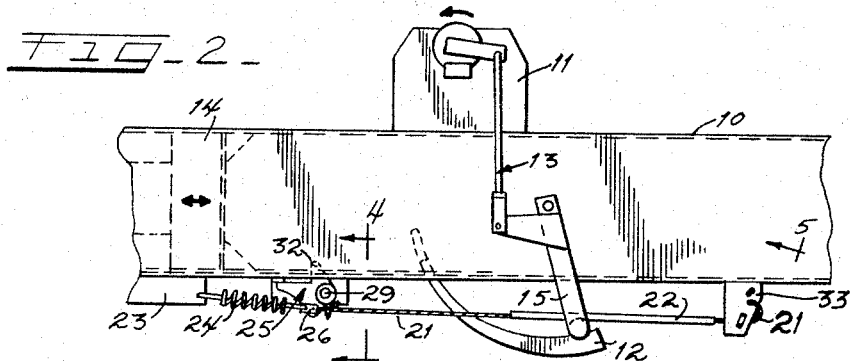
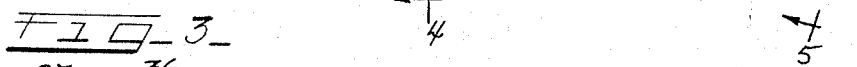
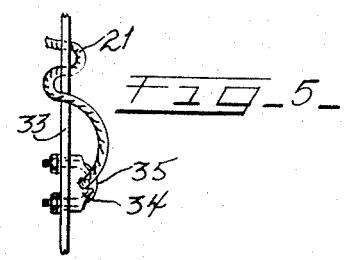
INVENTOR.
JOHN R. MAJKRZAK
BY
Ralph Alvey
ATT'Y.

United States Patent Office 3,334,577
Patented Aug. 8, 1967

3,334,577
PLUNGER SAFETY STOP FOR BALERS
John R. Majkrzak, Memphis, Tenn., assignor to International Harvester Company, Chicago, Ill., a corporation of Delaware
Filed Mar. 26, 1965, Ser. No. 442,927
3 Claims. (Cl. 100—19)

ABSTRACT OF THE DISCLOSURE

A device for emergency stopping of the plunger in a hay baling mechanism to provide protection for a baler needle, the device having a spring biased stop member which is cable operated by the baler needle supporting structure in timed sequence with the baler needle operation.

---

This invention pertains to the plunger stop of a hay baler, that is, to the emergency device that accompanies the baler needles into and out of the baling chamber and prevents the baler plunger from striking the baler needles while they are in the bailing chamber. In particular, the invention comprises a simplified means for actuating the plunger stop, so that the stop enters and leaves the baling chamber simultaneously with the needles.

The baler needle enters the baling chambers on completion of each bale to complete the loop of binding material around the bale, to deliver the tail end of the binding material to the twine knotter or wire twister, and to lay the binding material for the start of the next bale. Ordinarily, the needle has less than one second to complete its stroke, since the plunger reciprocates at about 65 strokes per minute and the needle must complete its stroke in slightly less than the time allotted for one plunger stroke. The slightest mistiming of the baler needle and the baler plunger (e.g. late withdrawal of the needle from the bailing chamber) can, therefore, enable the plunger to strike the needle and destroy it. To prevent such accidents, balers are equipped with a plunger stop that enters the bailing chamber with the needle and stops the plunger, if necessary, to prevent it from striking the needle. If the plunger strikes the plunger stop, a shear bolt in the plunger drive shears and disconnects the plunger from its power source. Since shear bolts are less expensive than baler needles and are easier to replace, it is more economical to sacrifice the shear bolt to save a needle.

Objects

The objects of the present invention are, in general, to provide an improved plunger stop. A particular object of the invention is to provide a plunger stop having fewer parts than prior art plunger stops, yet capable of performing with equal or greater effectiveness all functions of prior art plunger stops. Another particular object of the present invention is to provide a plunger stop requiring less material and labor to construct and presenting, therefore, fewer parts to maintain. An additional object of this invention is to provide a plunger stop less subject to malfunction through deterioration or inoperativeness.

Drawings

The preferred mode of the present invention is shown in the attached drawings, where:

FIG. 1 is a section through the baling chamber of a baler, showing the plunger stop withdrawn from the chamber;

FIG. 2 is a section similar to FIG. 1, showing the plunger stop in operation;

FIG. 3 is an enlarged view showing the connection of the actuating wire rope to the plunger stop;

FIG. 4 is a view of the plunger stop taken on line 4—4 of FIG. 2;

FIG. 5 is a view of the wire rope attachment taken on line 5—5 of FIG. 2.

Description

The plunger stop forming the present invention is part of the binding mechanism of a baler, that is the mechanism that applies binding material to the bales to hold them together. Whether the binding mechanism uses twine (e.g., U.S. Patent No. 3,101,963) or wire (e.g., U.S. Patent No. 3,119,323) as the binding material, certain features are common to each mechanism. In general, a binding mechanism includes (FIG. 1) a needle 12 attached to a tie pipe 15, which is pivotally mounted at 17 on a bailing chamber 10 of a baler, a drive mechanism 11 (also associated with a twine knotter or wire twister not shown) that actuates the needle in time with the twine knotter or wire twister and the baler plunger 14, a bellcrank linkage for transmitting power from drive mechanism 11 to needle 12, and a plunger stop mechanism 20. Tie pipe 15 is U-shaped, extending across the bottom of the baling chamber 10 and up both sides thereof to the pivots 17.

Plunger stop mechanism 20 (FIG. 1) comprises a cable 21 suspended between the plunger stop element 25 and a stationary bracket 33, and an extension spring 24 joining the plunger stop 25 to another stationary bracket 23. The purpose of plunger stop mechanism 20 is to stop baler plunger 14 and prevent it from striking baler needle 12 in the event the needle and the plunger get out of time.

Plunger stop element 25 (FIGS. 1–4) is the component that makes contact with the baler plunger in an emergency to arrest it. Stop element 25, which has the form of a bellcrank, includes a pivot pin 29 by which it is mounted on a pair of tabs 30 and 31 (FIG. 4) on the under side of baling chamber 10. One arm of the bellcrank comprises a stop abutment 32. Stop element 25 pivots about the axis of pin 29 from an inactive position where abutment 32 is retracted from the baling chamber 10 (FIG. 1) to a plunger stopping position where abutment 32 projects into the baling chamber through opening 18 in the bottom of the baling chamber (FIGS. 2, 4). The other arm of the bellcrank carries a strap 26 for spring 24 and an attachment 27 for wire rope 21.

Stop spring 24 (FIGS. 1, 2, 4) tends to urge plunger stop element 25 into the bailing chamber 10. Spring 24 is attached at one end to a stationary bracket 23 located on the underside of the bailing chamber 10. At its other end (FIG. 4), spring 24 is attached to a strap 26 on stop element 25. Spring 24 is a tension type spring and is always extended to a greater or less degree so that it exerts a pulling force tending to swing stop element 25 about its pivot 29 into baling chamber 10 through the opening 18.

Wire rope 21 (FIGS. 1–5) transfers a force from baler tie pipe 15 to swing stop element 25 out of baling chamber 10. At its one end, rope 21 is attached to a stationary bracket 33 on the underside of baling chamber 10. The rope 21 is laced through holes in the bracket 33 (FIG. 5) and its end is secured to the bracket by a cable clamp 34 and U-bolt 35. At its other end, rope 21 is looped around pin 27 on the side of stop element 25, the end of the rope being secured to the main run thereof by clamp 28 and U-bolt 36. Where rope 21 contacts needle tie pipe 15, it is enclosed in a plastic or rubber shield 22 so as not to wear a groove in the tie pipe. The length of rope 21 is sufficient to allow stop element 25 to swing into the baling chamber 10 when so urged by spring 24; yet the length is short enough that action on the rope 21 by tie pipe 15 is effective to swing stop element 25 out of baling chamber 10.

Operation

While a bale of hay 19 is being formed, needle 12 is at rest in its home position (FIG. 1) below baling chamber 10. Needle tie pipe 15 presses upward against the shielded section 22 of rope 21, causing the rope to swing stop element 25 counterclockwise (FIG. 1) about pivot 29 to a position where abutment 32 is outside baling chamber 10. When stop element 25 is in the position of FIG. 1, spring 24 exerts a maximum force on the stop element, tending to swing it clockwise about pivot 29. Such clockwise movement is, however, prevented by the pressing action of the pipe 15 against shielded section 22 of rope 21.

On completion of a bale of hay, a linkage (not shown) actuates the drive mechanism 11 and needle drive 13 to swing needle 12 into the baling chamber 10 (FIG. 2) on a delivery stroke. At this instance plunger 14 is moving outwardly on its return stroke. Needle tie pipe 15 swings away from and releases rope 21 so that it does not restrain plunger stop 25. Spring 24 simultaneously snaps back to its non-extended position (FIG. 2), swinging stop element 25 into the baling chamber 10 through opening 18. So long as needle 12 is inside baling chamber 10, abutment 32 of stop element 25 remains in the baling chamber between plunger 14 and needle 12 to prevent plunger 14 from striking and destroying the needle.

As baler plunger 14 moves in on another compaction stroke, needle 12 moves out of baling chamber 10 on its return stroke. Tie pipe 15 swings up against shield 22 on rope 21, causing the rope to pivot stop element 25 counterclockwise (FIG. 1) about pivot 29. Abutment 32 is moved out of the baling chamber 10 to the at rest position of FIG. 1.

Should needle 12 accidentally move into the baling chamber 10, as would happen if needle brake 16 were to slip, stop element 25 would also move into the baling chamber 10 and protect needle 12 from plunger 14 by stopping the plunger on its next compaction stroke. Stop element 25 is sturdy enough to arrest plunger 14 and to sever a shear bolt connection in the plunger drive. The plunger is restored to service by replacing the broken shear bolt.

The above description covers only the preferred mode of this invention and is not to be constructed as limiting the invention to that mode and its details, since the invention embraces all equivalent modes that fall within the spirit and scope of the attached claims.

What is claimed is:
1. In a baler, a plunger stop mechanism comprising: a supporting structure, a plunger stop element pivotally mounted on said supporting structure, said stop element being pivotal in a first direction to a plunger stopping position and in a second direction to an inactive position; a spring connected to said supporting structure and to said stop element and urging said stop element towards said plunger stopping position; a rope, one end of said rope being fastened to said plunger stop element and the other end thereof being fastened to said supporting structure, said last named end of said rope being stationary; a baler needle tie pipe pivotally mounted on said supporting structure, a baler needle on said tie pipe, said tie pipe being pivotal in one direction to move said needle on a delivery stroke and in a reverse direction to move said needle on a return stroke, said tie pipe during pivotal movement in said reverse direction pushing directly against said rope in a direction transversely thereof at a point intermediate the ends thereof to pivot said stop element to said inactive position.

2. A plunger stop mechanism, as recited in claim 1; wherein said spring is a coil spring and said rope is a wire rope, said rope being enclosed in a protective shield in the region where it is acted upon by said tie pipe.

3. A plunger stop mechanism, as recited in claim 2; wherein a pair of tabs are mounted on said supporting structure and said stop element is pivotally mounted intermediate said tabs, said support structure includes two brackets, said coil spring is connected to one of said brackets and said rope is connected to the other of said brackets.

References Cited
UNITED STATES PATENTS

| | | | |
|---|---|---|---|
| 1,812,411 | 6/1931 | Norton | 292—84 X |
| 2,622,507 | 12/1952 | Hitchcock et al. | 100—19 |
| 2,868,114 | 1/1959 | Hollyday | 100—19 |
| 2,882,813 | 4/1959 | Nelson et al. | 100—19 |
| 2,957,407 | 10/1960 | Vutz et al. | 100—19 |
| 3,027,825 | 4/1962 | Nolt et al. | 100—53 X |

LOUIS O. MAASSEL, *Primary Examiner.*